US009415449B2

(12) United States Patent
Herud

(10) Patent No.: US 9,415,449 B2
(45) Date of Patent: Aug. 16, 2016

(54) ROTARY CUTTING TOOL AND TOOL UNIT

(71) Applicant: Kennametal Inc., Latrobe, PA (US)

(72) Inventor: Josef K. Herud, Herzogenaurach (DE)

(73) Assignee: KENNAMETAL INC., Latrobe, PA (US)

(*) Notice: Subject to any disclaimer, the term of this patent is extended or adjusted under 35 U.S.C. 154(b) by 130 days.

(21) Appl. No.: 14/142,786

(22) Filed: Dec. 28, 2013

(65) Prior Publication Data

US 2014/0193219 A1    Jul. 10, 2014

(30) Foreign Application Priority Data

Jan. 8, 2013   (DE) ............... 10 2013 100 104

(51) Int. Cl.
*B23B 31/107* (2006.01)
*B23B 51/00* (2006.01)
*B23B 31/00* (2006.01)
*B23B 51/02* (2006.01)

(52) U.S. Cl.
CPC ........... *B23B 51/00* (2013.01); *B23B 31/005* (2013.01); *B23B 31/1075* (2013.01); *B23B 51/02* (2013.01); *B23B 2231/026* (2013.01); *B23B 2260/0725* (2013.01); *Y10T 279/17761* (2015.01); *Y10T 279/17821* (2015.01); *Y10T 407/1946* (2015.01); *Y10T 408/885* (2015.01); *Y10T 408/907* (2015.01); *Y10T 409/30952* (2015.01)

(58) Field of Classification Search
CPC ............. B23B 31/1075; B23B 2231/026; B23B 2260/0725; B23B 51/02; Y10T 408/885; Y10T 408/888; Y10T 409/907; Y10T 279/17821; Y10T 279/17761

USPC .......... 408/197, 198, 226; 279/76, 83
See application file for complete search history.

(56) References Cited

U.S. PATENT DOCUMENTS

| 1,002,846 A * | 9/1911 | Hoefer ............. 408/226 |
| 1,539,439 A * | 5/1925 | August ........ B23B 31/02 279/74 |
| 1,635,909 A * | 7/1927 | Emil ........... B21D 28/34 279/30 |
| 2,466,315 A * | 4/1949 | Johansson ...... B23B 31/103 279/74 |
| 2,898,787 A * | 8/1959 | Hofbauer .......... 408/230 |
| 2,954,712 A * | 10/1960 | Andreasson ........ 408/59 |
| 3,534,640 A | 10/1970 | Macy |
| 3,536,335 A * | 10/1970 | Schmuck .......... 279/81 |
| 3,637,225 A * | 1/1972 | Schmuck .......... 279/81 |
| 4,610,564 A * | 9/1986 | Vantouroux ..... H01R 13/62 279/30 |
| 5,427,481 A | 6/1995 | Selb et al. |
| 6,089,798 A | 7/2000 | Wierspecker et al. |
| 6,474,656 B1 * | 11/2002 | Thomas ............ 279/30 |

(Continued)

FOREIGN PATENT DOCUMENTS

| DE | 4010597 A1 * | 10/1991 | ........ B23B 31/005 |
| DE | 102005055098 A1 | 6/2007 | |

*Primary Examiner* — Daniel Howell
*Assistant Examiner* — Yasir Diab
(74) *Attorney, Agent, or Firm* — Larry R. Meenan

(57) ABSTRACT

A rotary cutting tool, in particular a drill or milling cutter for heavy-duty cutting applications, is provided, said rotary cutting tool having at least one cutting edge and a shank having a free end. The shank has in its circumferential surface a groove for receiving a pull-out prevention element, wherein the groove extends axially and at the same time at least partially along the circumference of the shank and, starting at a distance from the free end of the shank, in the direction of the opposite free end. Also provided is a tool unit for a rotary cutting tool.

12 Claims, 1 Drawing Sheet

(56) References Cited

U.S. PATENT DOCUMENTS

| | | | |
|---|---|---|---|
| 6,675,917 B2 * | 1/2004 | Kleine et al. | 175/323 |
| 7,611,311 B2 | 11/2009 | Kakai et al. | |
| 7,810,817 B1 * | 10/2010 | Gao | B23B 31/1071 279/75 |
| 2009/0179368 A1 * | 7/2009 | Haimer | 269/54.2 |

* cited by examiner

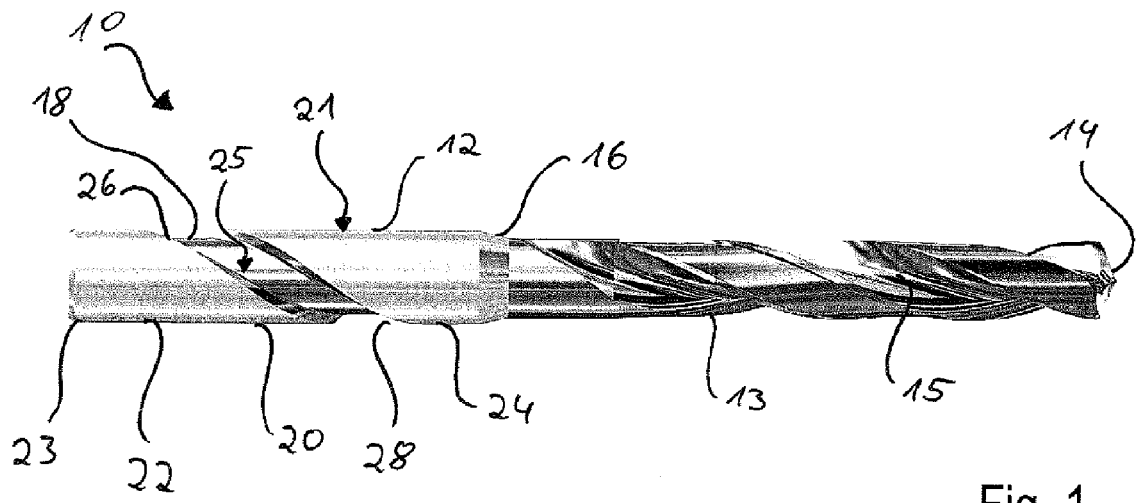
Fig. 1
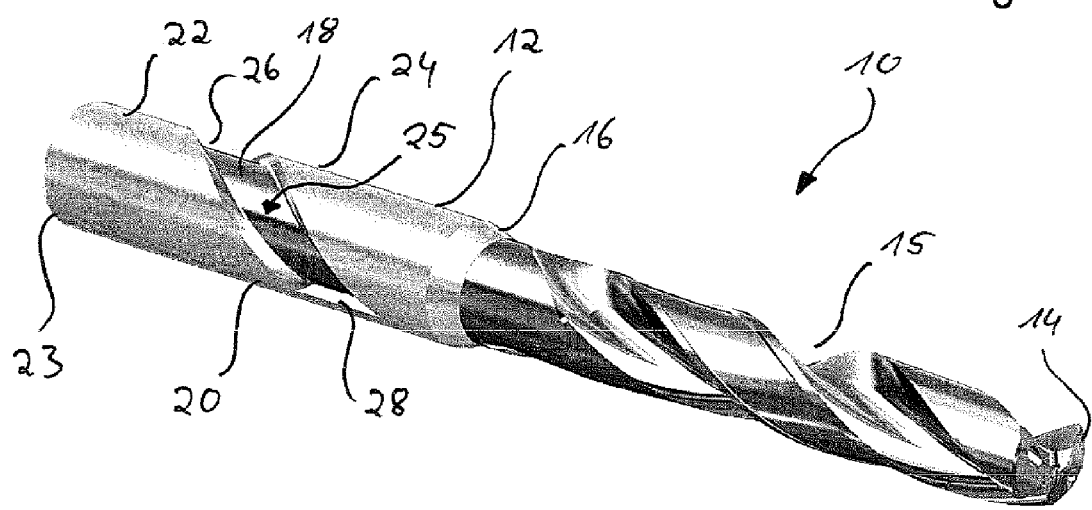
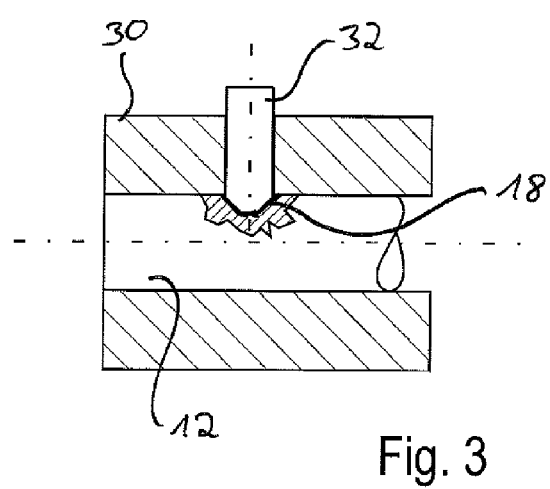
Fig. 2
Fig. 3

ROTARY CUTTING TOOL AND TOOL UNIT

CROSS-REFERENCE TO RELATED APPLICATION

This application claims priority from German Application Number 102013100104.1 filed Jan. 8, 2013, which is hereby fully incorporated herein by reference.

BACKGROUND OF THE INVENTION

The invention relates to a rotary cutting tool, in particular a drill or milling cutter for heavy-duty cutting applications, and to a tool unit.

Rotary cutting tools are typically clamped in place in a tool holder, wherein the rotary cutting tools are held in the tool holder by means of a correspondingly applied radial pressure force. However, it has been found that, in spite of the high clamping force, the rotary cutting tool can migrate axially as a result of vibrations. For example, during milling or cutting work at an angle of 45°, high vibrations occur which encourage this axial migration. The problem of axial migration has hitherto been solved by the provision of additional pull-out prevention elements which fix the rotary cutting tool in place in the tool holder in a form-fitting manner. This is achieved for example in that a clamping screw is passed through a bore in the tool holder, said clamping screw exerting a corresponding force on the rotary cutting tool. A further possibility is to provide the rotary cutting tool with a groove corresponding to the cross section of the clamping screw, the clamping screw projecting into said groove such that it fixes the rotary cutting tool in place.

The disadvantage with this solution has been found to be that, on account of the form fit, the position of the rotary cutting tool in the tool holder cannot be precision set or adjusted axially.

Therefore, it is the object of the invention to create a rotary cutting tool which is suitable for axial pull-out prevention and is additionally axially adjustable in the tool holder.

SUMMARY OF THE INVENTION

The object is achieved according to the invention by a rotary cutting tool, in particular a drill or milling cutter for heavy-duty cutting applications, having at least one cutting edge and a shank having a free end, said shank having in its circumferential surface a groove for receiving a pull-out prevention element, wherein the groove extends axially and at the same time at least partially along the circumference of the shank and, starting at a distance from the free end of the shank, in the direction of the opposite free end.

The rotary cutting tool according to the invention accordingly has a groove which serves both for precision setting the rotary cutting tool axially in a tool holder and for pull-out prevention. Along the curved groove profile, the rotary cutting tool can be axially adjusted in a corresponding manner by rotation of the cutting tool, wherein the pull-out prevention element runs in the groove during the axial setting of the rotary cutting tool. However, since the groove does not extend as far as the free end of the shank, the cutting tool can on no account be fully detached from the tool holder, since the end of the groove acts as a stop for the pull-out prevention element.

In a particularly preferred embodiment, provision is made for the groove to extend only in the axial center of the shank, in particular in the central third. This ensures the adjustability and a long, groove-free clamping-in length. The rotary cutting tool can be used universally, even for existing holders, since the latter often have pull-out prevention elements which act in the central third of the shank.

In particular, provision is made for the groove to extend helically around the shank with a constant or varying pitch. The axial precision setting of the rotary cutting tool in the tool holder is definable via the configuration of the groove. The greater the pitch of the groove in the shank, the smaller the rotation angle that is required for the axial precision setting of the rotary tool in order to achieve a particular axial adjustment length. Accordingly, the pitch of the groove determines the degree of precision of the axial setting.

In a particularly preferred embodiment, provision is made for the groove as a whole to extend at most over half the circumference of the shank, with the result that the shank still retains sufficient stability.

In particular, provision is made for the groove as a whole to extend along the shank over an axial length of at most 15 mm, in particular at most 10 mm This axial length is sufficient for the axial precision setting of the rotary cutting tool in the tool holder. Furthermore, two stops are thus defined by the axial ends of the groove.

Preferably, provision is made for the groove to have a round or angular profile as seen transversely to its longitudinal extension. The profile of the groove is in this case matched to the profile of the pull-out prevention element, so that no noticeable axial play arises between the pull-out prevention element and the groove and planar abutment occurs.

In a particularly preferred embodiment, provision is made for the groove to have the same direction of rotation as the cutting edge. This affords the advantage that axial migration of the rotary cutting tool in the tool holder is further prevented, since the identical direction of rotation of the groove and the cutting edge has the effect of blocking the axial migration.

Also provided is a tool unit, which has a tool holder and a rotary cutting tool according to the invention, wherein the tool holder has a receptacle for the shank and a pull-out prevention element which extends into the groove in the tool in order to prevent the tool from being pulled axially out of the receptacle during operation. The tool is protected against migrating in the tool holder and can additionally be axially precision set.

In particular, provision is made for the groove to have an axial extent which corresponds to the axial extent of the pull-out prevention element. This ensures that the pull-out prevention element fits into the groove of the tool, with no axial play occurring between the pull-out prevention element and the tool, such that precise operation of the tool unit is guaranteed.

Provision is preferably made for the pull-out prevention element to be adjustable laterally from a starting position, in which it does not project radially into the receptacle and the tool is introduced into the holder, into a locking position, in which it projects into the groove. The tool can be pre-fixed in place via the pull-out prevention element, in that the pull-out prevention element is transferred into a pre-fixing position in which it projects into the groove such that the tool can be axially precision set. After axial precision setting, the pull-out prevention element can be transferred into the locking position in order to fix the tool in place in the tool holder.

BRIEF DESCRIPTION OF THE DRAWINGS

Further features and advantages of the invention can be gathered from the following description and the following drawings, to which reference is made, and in which:

FIG. 1 shows a side view of the rotary cutting tool according to the invention, with a view of the groove, FIG. 2 shows a perspective view of the rotary cutting tool from FIG. 1, and, FIG. 3 shows a longitudinal sectional view through a tool unit according to the invention.

DETAILED DESCRIPTION

FIGS. 1 and 2 show a rotary cutting tool 10 in the form of a drill, which has a shank 12 and a cutting section 13 having a cutting edge 14 and a flute 15. The cutting section 13 and the shank 12 merge into one another in a transition region 16 in order in this way to form the entire rotary cutting tool 10.

In the embodiment shown, the shank 12 of the rotary cutting tool 10 has a groove 18 which is arranged in the axially central section 20 of the shank 12 and extends on the circumferential surface 21 of the shank 12.

The shank 12 is subdivided into three sections which are approximately the same length axially, specifically the central section 20, an end section 22 having a free end 23, and an intermediate section 24. The groove 18 extends only in the central section 20.

The axial center point of the groove 18 is arranged in the axial center 25 of the shank 12.

Since the groove 18 extends in the central section 20, there are two stops 26, 28 at the end of the groove. Said stops 26, 28 are arranged in the transition regions between the central section 20 and the end section 22 and also the intermediate section 24. The opposite axial ends of the stops 26, 28 have an axial spacing of 10 mm. The axial length of the groove 18 defines the maximum axial precision adjustment range of the rotary cutting tool 10 in a tool holder.

The groove 18 extends helically along the shaft 12 with a constant pitch, wherein the pitch of the groove 18 has the same direction of rotation as the flute 15. The identical direction of rotation of the groove 18 has the effect that the rotary cutting tool 10 is protected from axial migration during operation. The groove 18 extends only around half the circumference of the shank 12.

The pitch of the groove 18 could also change along the course of the groove, in order for example, during axial setting, to ensure a rougher precision setting section in the central region of the course of the groove and more precise setting toward the stops 26, 28.

FIG. 3 illustrates a tool unit having the rotary cutting tool 10 shown in FIGS. 1 and 2 and a tool holder 30 which may comprise a plurality of clamping jaws. The tool holder 30 has a radial receiving opening, preferably having an internal thread into which a pull-out prevention element 32, in this case for example in the form of a screw, can be screwed more or less deeply in the direction of the cutting tool 10. The pull-out prevention element 32 has at its tip a cross-sectional profile which corresponds to the profile of the groove 18, as seen transversely to the longitudinal extension thereof.

In the embodiment illustrated, the groove 18 has a trapezoidal cross-sectional profile and the pull-out prevention element 32 has a flat tip with lateral chamfers so that, here too, a trapezoidal shape is provided in the corresponding sectional view. The profile of the groove 18 could also adopt any other desired form. All that is important is that the pull-out prevention element 32 is introducible into the groove 18 such that it can effect force-fitting clamping.

In order to introduce the cutting tool 10 into the tool holder 30, the pull-out prevention element 32 is screwed toward the outside such that the shank 12 can be moved axially along the pull-out prevention element 32. Subsequently, the pull-out prevention element 32 is moved somewhat radially inward such that it projects into the groove 18. By rotating the cutting tool 10, the axial position of the cutting tool 10 can then be precision adjusted. Following the axial precision setting of the rotary cutting tool 10, the pull-out prevention element 32 is screwed in further radially and fixes the rotary cutting tool 10 in place in a corresponding manner, with axial migration of the rotary cutting tool 10 being prevented.

The rotary cutting tool 10 can be used universally for common tool holders which have a pull-out prevention means that is assigned to the central section 20 of the shank 12.

What is claimed is:

1. A rotary cutting tool for heavy-duty cutting applications, comprising:
   at least one cutting edge and a shank having a free end; and
   said shank having in its circumferential surface a groove that extends helically around the shank for receiving a pull-out prevention element,
   wherein the groove extends axially and at the same time at least partially along the circumference of the shank and, starting at a distance from the free end of the shank, in the direction of the opposite free end,
   wherein the groove as a whole extends at most over half the circumference of the shank.

2. The rotary cutting tool as claimed in claim 1, wherein the groove extends only in an axial center of the shank, in particular in a central third.

3. The rotary cutting tool as claimed in claim 1, wherein the groove extends helically around the shank with a constant pitch.

4. The rotary cutting tool as claimed in claim 1, wherein the groove as a whole extends along the shank over an axial length of at most 15 mm.

5. The rotary cutting tool as claimed in claim 1, wherein the groove has a round profile as seen transversely to its longitudinal extension.

6. The rotary cutting tool as claimed in claim 1, wherein the groove has the same direction of rotation as the cutting edge.

7. A tool unit composed of a tool holder and a rotary cutting tool as claimed in claim 1, wherein the tool holder has a receptacle for the shank and a pull-out prevention element which extends into the groove in the tool in order to prevent the tool from being pulled axially out of the receptacle during operation.

8. The tool unit as claimed in claim 7, characterized in that the groove has an axial extent which corresponds to the axial extent of the pull-out prevention element.

9. The tool unit as claimed in claim 8, characterized in that the pull-out prevention element is adjustable laterally from a starting position, in which it does not project radially into the receptacle, into a locking position, in which it projects into the groove.

10. The rotary cutting tool as claimed in claim 1, wherein the groove has an angular profile as seen transversely to its longitudinal extension.

11. The rotary cutting tool as claimed in claim 4, wherein the groove as a whole extends along the shank over an axial length of at most 10 mm.

12. A rotary cutting tool, comprising:
   at least one cutting edge and a shank having a free end; and
   said shank having in its circumferential surface a groove that extends helically around the shank for receiving a pull-out prevention element,
   wherein the groove extends axially and at the same time at least partially along the circumference of the shank and, starting at a distance from the free end of the shank, in the direction of the opposite free end, wherein the groove extends only in an axial center of the shank, wherein the groove as a whole extends at most over half the circumference of the shank.

* * * * *